No. 878,250. PATENTED FEB. 4, 1908.
L. M. STERNBERGH.
PHOTOGRAPHIC CAMERA.
APPLICATION FILED JUNE 28, 1907.

Inventor
L. M. Sternbergh,

UNITED STATES PATENT OFFICE.

LAYMAN M. STERNBERGH, OF PATERSON, NEW JERSEY.

PHOTOGRAPHIC CAMERA.

No. 878,250.  Specification of Letters Patent.  Patented Feb. 4, 1908.

Application filed June 28, 1907. Serial No. 381,268.

*To all whom it may concern:*

Be it known that I, LAYMAN M. STERNBERGH, citizen of the United States, residing at Paterson, in the county of Passaic and State of New Jersey, have invented certain new and useful Improvements in Photographic Cameras, of which the following is a specification.

This invention has for its object to devise novel means to facilitate the focusing of images upon the screen of a photographic camera preliminary to exposing the sensitized plate or film in taking a photograph of the object to be pictured.

The invention enables the focusing to be effected either in vertical or horizontal position and whether the camera is located overhead or below the line of vision and close to the ground.

The invention relates more particularly to the back and to cameras provided with reversible backs, whereby the latter may be placed in position with the major axis of the opening either vertical or horizontal and in either position admitting of the door leading to the focusing screen being hinged so as to be swung outward and rearward from the uppermost edge.

For a full understanding of the invention and the merits thereof and also to acquire a knowledge of the details of construction and the means for effecting the results, reference is to be had to the following description and accompanying drawings.

Figure 1:
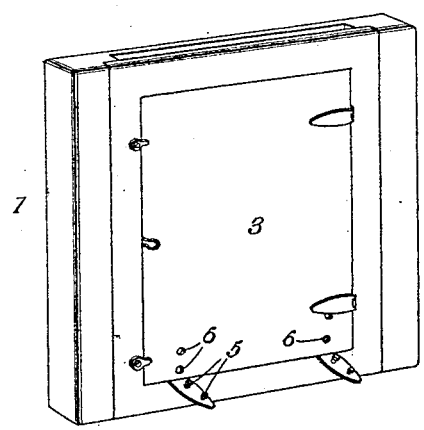
Figure 5:
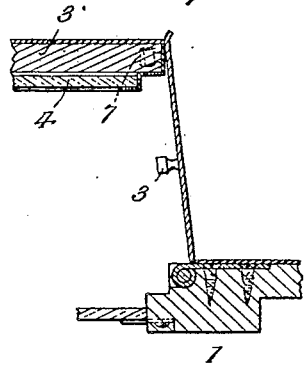
Figure 2:
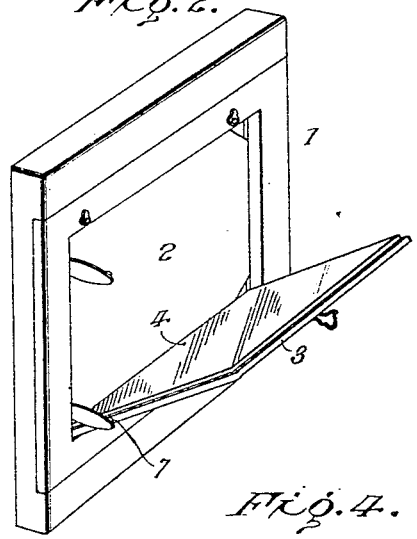
Figure 3:
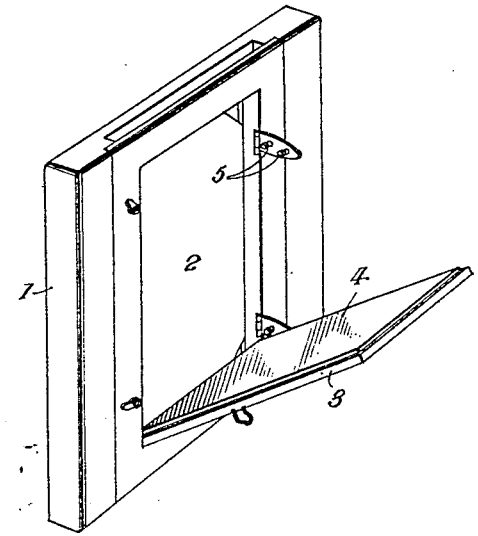
Figure 4:
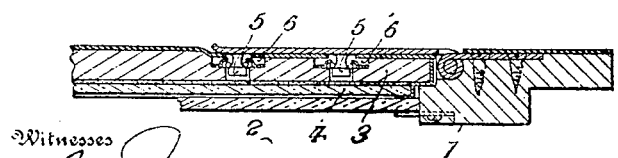

While the invention may be adapted to different forms and conditions by changes in the structure and minor details without departing from the spirit or essential features thereof, still the preferred embodiment is shown in the accompanying drawings, in which:

Figure 1 is a perspective view of a reversible back for cameras showing the lowermost hinges swung outward and downward by full lines and attached to the door by dotted lines. Fig. 2 is a perspective view showing the back in position when arranged with the major axis of the screen opening horizontally and with the door opened and secured in position for reflecting the image upon a vertical line. Fig. 3 is a perspective view similar to Fig. 2, showing the back turned and with the major axis of the door in vertical position. Fig. 4 is a sectional view of a hinged joint. Fig. 5 is a sectional view showing the manner of using one of the hinges as a brace for focusing the position of the door when swung open to focusing position.

Corresponding and like parts are referred to in the following description and indicated in all the views of the drawings by the same reference characters.

The back illustrated is of the reversible variety so as to be turned to admit of taking a vertical or a horizontal picture. The back comprises a plate holding frame 1 and a focusing screen frame 2, the two frames being held together by means of springs in order to receive between them the plate holder carrying the sensitized plate, film or the like. The opening in the frame 2 is oblong and the ground glass constituting the screen, upon which the image of the object of the photograph is thrown, is fitted therein and of corresponding shape. The door 3 closing the opening is provided upon its inner side with a mirror 4 which reflects the image and at the same time inverts the same so that it may appear in natural position to the operator. Ordinarily the image as reflected upon the focusing screen is inverted and appears to the operator upside down and the provision of the mirror 4 corrects this feature and causes the image to appear right side up as used by the operator without the intervention of the photograph apparatus. It will thus be understood that the provision of the mirror is of vital importance since it enables lights and shadows to be properly determined as well as the proper focusing and relative arrangement of the image with reference to the screen and surroundings.

The door 3 is connected to the focusing screen frame 2 by means of hinges which are of similar or like formation and which preferably have permanent attachment with the focusing screen frame and detachable connection with the door 3, thereby admitting of the door being swung upon either a short edge or a long edge, according as the back is arranged with the opening vertical or horizontal. The construction of the hinges is immaterial so long as they admit of the door being swung outward and downward from the uppermost edge when the back is arranged with the opening either vertical or horizontal. Each hinge comprises two members, one being attached to the frame 2 and the other adapted to make detachable connection with the door 3, and these hinges are arranged upon adjacent sides of the frame 2 corresponding to a short side and to a long side, thereby admitting of the door 3 being swung open upon either a short side or a long side. The hinge members designed to make detachable connection with the door 3 are provided with interlocking elements to coöperate with complemental interlocking elements upon the door and for convenience the loose hinge members are provided with studs 5 and the door with sockets 6 to receive the studs 5, and said parts 5 and 6 being constructed in any manner to admit of their separation and to insure their interlocking when, said parts being preferably constructed after the manner of the well known separable buttons or fastenings, comprising interlocking studs and spring sockets. It is to be understood that any number of hinged connections may be provided along either side of the opening closed by the door 3. When the door is adapted to be swung upon a long side, the hinges fitted to the short side of the door opening have their outer members detached from the door, and the reverse of this is true when the door is arranged to swing open upon a short side, the hinges fitted to the long side of the door opening being disconnected from the door. When the door is swung open to the required angular position, it is held in such position by means of the hinge nearer the hinged edge of the door, this being effected by engaging a stud 5 of the loose hinge member with a socket 7 in an edge of the door 3. The hinged edges of the door are provided with sockets 7 to receive a stud of a hinge member so as to hold the door open and at the required position when turned upon either a short or a long edge. In the event of applying the invention to a photographic camera not provided with a reversible back, it is to be understood that the camera itself must be turned when changing the opening from vertical to a horizontal position, or vice versa. In this case the door 3 will be hinged to the back of the camera in the manner substantially as stated herein, it being understood that in either position of the apparatus the door 3 is adapted to swing outward and rearward from its uppermost edge.

The following may be noted as some of the advantages resulting from the invention; namely, the image is seen right side up on the mirror 4 instead of inverted on the focusing screen as usual, thereby enabling the operator to correctly focus the object and to fully appreciate the effect of the light and shadows and also to fully take cognizance of the effect of the surroundings which is not possible to the average person when focusing by means of the usual ground glass screen. The door 3 with the mirror attached may be held in any predetermined angle, whether focusing horizontally or vertically, thereby admitting of equitably focusing with the camera either below the level of the eye without bending to obtain a view of the focusing screen or with the camera above the level of the eye, thereby permitting the focusing in a crowd or over a wall or other obstacle, and lastly admitting of the camera being used as a deceptive angle camera holding the same at right angles to the line of vision. It is further noted that by having the door detachably connected to the focusing screen frame 2, it may be removed should the operator desire at any time to focus directly upon the ground glass.

Having thus described the invention, what is claimed as new is:

1. In a photographic camera, the combination of a focusing screen frame having the usual opening and ground glass screen, a door for closing said opening, and a mirror applied to the inner side of the door for reflecting the image thrown upon the focusing screen.

2. In a photographic camera, the combination of a focusing screen frame having the usual opening and ground glass screen, a door for closing said opening, a mirror applied to the inner side of the door for reflecting the image thrown upon the focusing screen, and means for connecting the door to the focusing screen frame at either side of the opening, whereby said door may be swung outward and downward from its uppermost edge when the focusing screen frame is arranged with the opening either horizontal or vertical.

3. In a photographic camera, the combination of a focusing screen frame having an oblong opening, a door for closing said opening and provided upon its inner side with a reflecting mirror, hinges fitted to the focusing screen frame along adjacent sides of the opening therein, and interlocking means between said hinges and adjacent edges of the door whereby either set of hinges may be detached from the door to admit of the latter being swung upon the opposite set of hinges.

4. In a photographic camera, the combination of a focusing screen frame having an oblong opening, a door for closing said opening and provided upon its inner side with a reflecting mirror, hinges fitted to the focusing screen frame along adjacent sides of the opening therein, interlocking means between said hinges and adjacent edges of the door whereby either set of hinges may be detached from the door to admit of the latter being swung upon the opposite set of hinges, and interlocking means between one of the hinges and the door to hold the latter open at the desired angular position.

5. In a photographic camera, the combination of a screen frame having an oblong opening, a door for closing said opening and provided upon its inner side with a mirror, hinges fitted to adjacent sides of the focusing screen frame and having one member of each loose and provided with interlocking studs, and sockets along a short and a long side of the door and in corresponding edges thereof to coöperate with the studs of the loose members of the aforementioned hinges, whereby the door may be swung open upon either a short or a long side and secured when opened to the required angular position.

In testimony whereof I affix my signature in presence of two witnesses.

LAYMAN M. STERNBERGH. [L. S.]

Witnesses:
 DAVID H. STERNBERGH,
 ALBIN SMITH.